(12) United States Patent
Bjontegaard

(10) Patent No.: US 7,327,785 B2
(45) Date of Patent: Feb. 5, 2008

(54) NOISE REDUCTION METHOD, APPARATUS, SYSTEM, AND COMPUTER PROGRAM PRODUCT

(75) Inventor: Gisle Bjontegaard, Oppegard (NO)

(73) Assignee: Tandberg Telecom AS, Lysaker (NO)

( * ) Notice: Subject to any disclaimer, the term of this patent is extended or adjusted under 35 U.S.C. 154(b) by 382 days.

(21) Appl. No.: 10/880,460

(22) Filed: Jul. 1, 2004

(65) Prior Publication Data

US 2005/0031036 A1 Feb. 10, 2005

(30) Foreign Application Priority Data

Jul. 1, 2003 (NO) ................................ 20033021

(51) Int. Cl.
H04B 1/66 (2006.01)
(52) U.S. Cl. .............................. 375/240.03
(58) Field of Classification Search .......... 375/240.13, 375/240.24, 240.03, 240, 240.1, 240.25; 358/463, 464; H04B 1/66
See application file for complete search history.

(56) References Cited

U.S. PATENT DOCUMENTS

| | | | |
|---|---|---|---|
| 4,679,079 A | | 7/1987 | Catros et al. |
| 5,237,410 A | | 8/1993 | Inoue |
| 5,610,729 A | * | 3/1997 | Nakajima ................ 358/463 |
| 5,739,863 A | * | 4/1998 | Ohtsuki ................ 375/240.04 |
| 6,037,985 A | | 3/2000 | Wong |
| 6,125,143 A | | 9/2000 | Suzuki et al. |
| 6,141,379 A | * | 10/2000 | Sugiyama ................ 375/240.14 |
| 6,160,844 A | * | 12/2000 | Wilkinson ................ 375/240 |
| 6,560,283 B1 | * | 5/2003 | Fletcher ................ 375/240.1 |
| 2002/0024999 A1 | | 2/2002 | Yamaguchi et al. |
| 2002/0168011 A1 | | 11/2002 | Bourge |
| 2004/0179610 A1 | * | 9/2004 | Lu et al. ................ 375/240.25 |
| 2006/0209951 A1 | * | 9/2006 | Zhu ................ 375/240.03 |

FOREIGN PATENT DOCUMENTS

EP 0 549 813 A1 7/1993

OTHER PUBLICATIONS

Liao, J. Y. et al. "Adaptive Intra Update for Video Coding Over Noisy Channels", Int Conf on Image Processing, Proc of 3$^{rd}$ IEEE Int Cont on, Lausanne, Switz, Sep. 16-19, 1996, New York, USA; vol. 3, pp. 763-766.

Delcorso, S. et al. "Novel Approach for Temporal Filtering of MPEG Distortions"; 2002 IEEE Int Conf on Acoustics, Speech and Signal Processing, Proc of Int Conf on, Orlando, FL, USA, May 13-17, 2002; vol. 4, pp. IV3720-IV3723.

(Continued)

*Primary Examiner*—Tung Vo
(74) *Attorney, Agent, or Firm*—Oblon, Spivak, McClelland, Maier & Neustadt, P.C.

(57) ABSTRACT

A video coding apparatus, method, and computer program product for removing transform coding noise especially in flat areas of a frame, which appears as remaining parts of moving objects in a video picture. Transform coding noise is removed by forcing a macroblock to be intra coded instead of inter coded when certain criteria are fulfilled so as to reveal whether the macroblock contain annoying quantization generated noise and to detect if an equalization is necessary.

14 Claims, 3 Drawing Sheets

OTHER PUBLICATIONS

Liao, J. Y. et al. "Adaptive Intra Update for Video Coding over Noisy Channels", Int Cont on Image Processing, Proc of 3$^{rd}$ IEEE Int Cont on, Lausanne, Switz, 16-19 Sep. 1996, New York, USA; vol. 3, pp. 763-766.

Delcorso, S. et al. "Novel Approach for Temporal Filtering of MPEG Distortions"; 2002 IEEE Int Conf on Acoustics, Speech and Signal Processing, Proc of Int Conf on, Orlando, FL, USA, 13-17 May 2002; vol. 4, pp. IV3720-IV3723.

* cited by examiner

NOISE REDUCTION METHOD, APPARATUS, SYSTEM, AND COMPUTER PROGRAM PRODUCT

BACKGROUND OF THE INVENTION

1. Field of the Invention

The invention is related to video compression systems, methods, and computer program products.

2. Description of the Related Art

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors. The prediction process is typically performed on square block sizes (e.g. 16×16 pixels). In some cases however, predictions of pixels based on the adjacent pixels in the same picture rather than pixels of preceding pictures are used. This is referred to as intra prediction, as opposed to inter prediction.

The residual represented as a block of data (e.g. 4×4 pixels) still contains internal correlation. A well-known method of taking advantage of this is to perform a two dimensional block transform. The ITU recommendation H.264 uses a 4×4 integer type transform. This transforms 4×4 pixels into 4×4 transform coefficients and they can usually be represented by fewer bits than the pixel representation. Transform of a 4×4 array of pixels with internal correlation will probability result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. The possible value range of the transform coefficients is divided into value intervals each limited by an uppermost and lowermost decision value and assigned a fixed quantization value. The transform coefficients are then quantified to the quantization value associated with the intervals within which the respective coefficients reside. Coefficients being lower than the lowest decision value are quantified to zeros. It should be mentioned that this quantization process results in that the reconstructed video sequence is somewhat different compared to the uncompressed sequence.

As already indicated, one characteristic of video content to be coded is that the requirements for bits to describe the sequence is strongly varying. For several applications it is well known for a person skilled in the art that the content in a considerable part of the picture is unchanged from frame to frame. H.264 widens this definition so that parts of the picture with constant motion can also be coded without use of additional information. Regions with little or no change from frame to frame require a minimum number of bits to be represented. The blocks included in such regions are defined as "skipped", reflecting that no changes or only predictable motion relative to the corresponding previous blocks occur, hence no data is required for representing these blocks other than an indication that the blocks are to be decoded as "skipped". This indication may be common to several macroblocks.

The present standards of video coding (H.263/H.264, both of which are incorporated herein by reference) are very efficient in reducing bit rate, still maintaining reasonable overall subjective image quality. The errors introduced are mostly acceptable from a subjective point of view even if the objective error of the reconstructed image is similar to what we would get if we used pixel representation and reduced the number of bits/pixel from 8 to 4.

There are numerous examples within the prior art that discloses techniques for pixel prediction or quantization processes, so as to reduce the subjective noise. From U.S. Pat. No. 6,037,985 to Wong it is known a method for video compression; this method is dealing with defects caused by compression. This publication is focusing on subjective quality within single windows, usually referred to as intra-picture. The tools used in this publication for improvement of subjective quality within single windows are:

- Estimate "noise immunity" based on sharp edges in proximity of smooth surfaces, this technique has long been known to a person skilled in the art.
- The result from the previous estimation is used so as to affect the Q-factor, the adjustment of the Q-factor is the only constructive feature referenced.
- Traversing the picture in several passes (steps) so as to adjust the Q-factor to each single macroblock (MB) resulting in a "target" bit count for the picture and further take into account the estimated "noise immunity" so as to better the subjective quality of the picture.

However U.S. Pat. No. 6,037,985 does not propose any solution to annoying subjective noise due to movements from one picture to the next. From U.S. Patent Publication 2002/0168011 by Bourge, it is disclosed another familiar method of detecting noise in a flow of video data coded by macroblock according to a predictive block-based encoding technique. However this method does not solve problems caused by movement from one picture to the next.

In the following, explanations of mechanisms causing severe visibly annoying effects will be given, effects that are not addressed by the above referenced publications.

However, it is well known that certain types of video material tend to cause visibly annoying artifacts. The problem is particularly related to edges or transitions between relatively "flat" areas in the image, i.e. areas of relatively uniform pixel values. The problem is generally related to errors introduced by the quantization of transform coefficients, but it is more evident in the case of a moving object disclosing a smooth background. The problem is illustrated in the left-hand side of FIG. 1. As the dark part is moving, it leaves behind some black "rubbish" in a background area that is supposed to be uniformly light.

These phenomena have been well known as long as the present prediction/transform coding has been in use. The phenomenon has sometimes been called "dirty window effect". Similar phenomena have also been referred to as "mosquito effect".

Another similar effect is related to the block segmentation used in connection with coding as described earlier. The block coding is a powerful overall tool for compression, and takes the advantage of correlation between neighboring pixels. However, the method is not well suited to treat singular pixel values. This is reflected in the case where a block mainly includes "flat" content, except from one or a few pixels close to an edge or a corner of the block that differs significantly. This can typically happen if the block just touches a different object. In such situations the singular pixels can be left unchanged resulting in annoying black or white spots near the block border in the decoded frame e.g. when the different object start moving away from the block. The problem is illustrated on the right-hand side of FIG. 1. Here, a black area, originally in a stationary position marginally covering one of the corners of a block, is about to move away from the block. The change due to the movement is so small that the block still will be indicated as "skipped", and thus, the block will remain unchanged. However, the changes appear to be greater in the adjacent block, and are therefore correctly updated (note that the above described "mosquito effect" may appear anywhere within a block independent of the presently discussed effect). The result is a remaining black corner well visible in the middle of a light area. This problem is referred to as a "corner problem".

SUMMARY OF THE INVENTION

It is an object of the present invention to provide a method avoiding the above described problems by providing a method, apparatus, system, and computer program product for noise prevention when coding a macroblock composed of a number of sub blocks representing a squared part of the video picture. The coding includes predicting pixel values of the macroblock, transforming the pixel values and/or prediction values of which, and/or quantifying resulting transformation coefficients, and executing a conditional uniformity test throughout the macroblock If the test indicates that a substantially subjective quantization generated noise due to movements in the video picture is likely to occur in a corresponding decoded version of the macroblock then selecting intra prediction of pixel values in the macroblock, or If the test indicates that no substantially subjective quantization generated noise due to movements in the video picture is likely to occur in a corresponding decoded version of the macroblock then selecting inter prediction of pixel values in the macroblock.

BRIEF DESCRIPTION OF THE DRAWINGS

In order to make the invention more readily understandable; the discussion that follows will refer to the accompanying drawing, in which.

DETAILED DESCRIPTION OF THE PRESENT INVENTION

Figure 1:
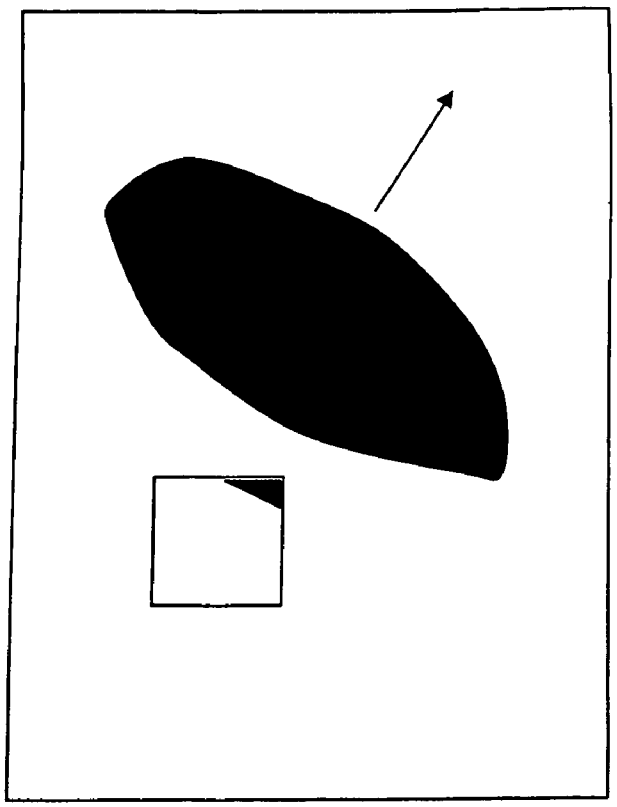
FIG. 1 illustrates two cases of quantization generated noise due to a moving object in a video picture.
Figure 1:
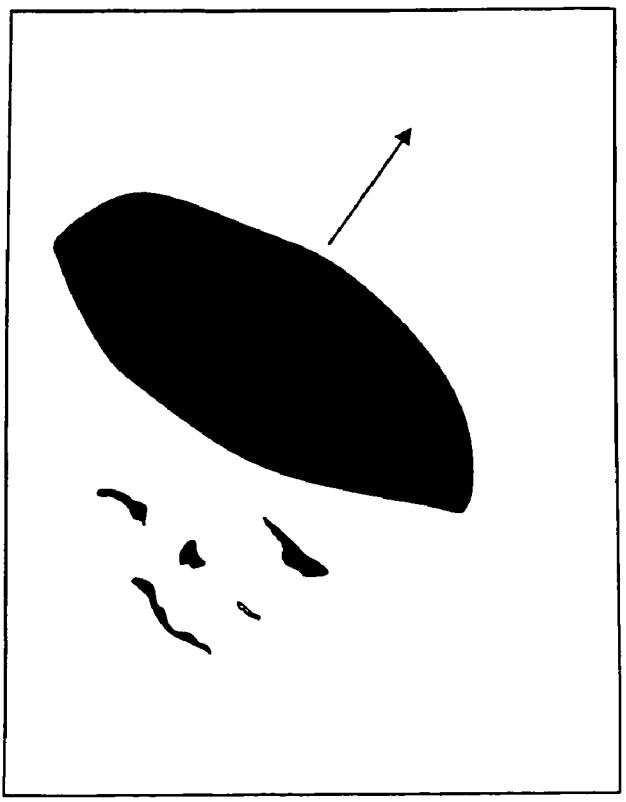

In the following, the present invention will be discussed by describing a preferred embodiment, and by referring to the accompanying drawings. However, a person skilled in the art will realize other applications and modifications within the scope of the invention as defined in the enclosed independent claim.

The present invention discloses a method for removing transform coding noise, especially in flat areas of a frame, which appears as remaining parts of moving objects in a video picture. This is provided by forcing a macroblock to be intra coded instead of inter coded when certain criteria are fulfilled. The purpose is to reveal whether the macroblock contain annoying quantization generated noise and to detect if an equalization is necessary.

The criteria may be defined as follows: The macroblock includes no or only small motion, there was motion in the same macroblock in the previous frame, the data to be coded is largely flat (relatively uniform throughout the block) whereas the prediction of the block includes less uniform content and a corner block contains singular divergent pixels.

If a combination of some or all of these conditions is fulfilled, a special mode of intra coding is used. This mode will typically produce a smooth data block and thus remove the annoying noise.

According to a preferred embodiment of the invention, detecting whether a macroblock includes no or only small motion is provided by investigating if the block could be defined as "skipped". This may be done without a full transformation of the pixel values. In this regard, a method called "early skip" is carried out. This method uses a simplified binary-transform instead of the full integer-transform defined in H.264 to detect the skipped mode. The transform is based on the Hadamard transform, and the basis vectors of which are as follows:

| K | K1 | K2 | K3 |
|---|---|---|---|
| 1 1 1 1 | 1 1 1 1 | 1 1 −1 −1 | 1 1 −1 −1 |
| 1 1 1 1 | 1 1 1 1 | 1 1 −1 −1 | 1 1 −1 −1 |
| 1 1 1 1 | −1 −1 −1 −1 | 1 1 −1 −1 | −1 −1 1 1 |
| 1 1 1 1 | −1 −1 −1 −1 | 1 1 −1 −1 | −1 −1 1 1 |

The basis vectors are multiplied with the residual of each of the 4×4 blocks of the macroblock. The residual is defined as the pixel-by-pixel difference between the macroblock to be coded and the collocated block in a previously decoded frame.

Multiplying the residual block with the basis vectors associated with the respective coefficient positions derives the binary-transform coefficients for a 4×4 block. Alternatively, the residual binary-transform coefficients may also be derived by first transforming each component (the macroblock to be coded and the collocated block, respectively), and then taking the difference between transform components.

However, with the above basis vectors the calculations are reduced to additions and subtractions.

Using the above basis vectors for deriving the four uppermost left coefficients provides a result that is reasonably close to the corresponding coefficients of the 4×4 integer type transform specified in H.264. In fact, the uppermost left coefficient would be identical to the real transform. Consequently, the lowest decision level for the DC coefficient of the 4×4 integer type transform could be used directly as thresholds for the respective four coefficients of the simplified transform. When no coefficient in any of the 4×4 blocks in a macroblock is above a threshold, the macroblock is defined as "skipped".

The simplified binary-transform is also used in investigating the other criteria. The binary-transform coefficients are utilized to calculate some parameters representing the characteristics of each block. The basis vector K0 shown above is used for calculating the DC value of the block with which it is multiplied. K1-K3 provides some of the corresponding AC value. Assume that O1, O2, O3 and O4 are the resulting coefficients when multiplying the basis vectors of the simplified transform with a 4×4 block of pixels to be coded. Further, assume that P1, P2, P3 and P4 are the coefficients of a transformation of the corresponding prediction. According to the present invention, for every m (=0,15) 4×4 block in a macroblock, a following first parameter is calculated:

$$AC0m = \sum_{k=1,3} |Ok|$$

This parameter reflects how much the block deviates from being totally "flat". A second parameter, reflecting how much the residuals between the original and predicted values of a block vary is also calculated. The second parameter is defined as follows:

$$AC1m = \sum_{k=1,3} |O,k - Pk|$$

The sum of the first and the second parameter across all 4×4 blocks in the macroblock are then calculated:

$$AC0 = \sum_{m=0,15} AC0m$$

$$AC1 = \sum_{m=0,15} AC1m$$

Thereafter, the number of 4×4 blocks in the macroblock in which considerable quantization generated noise is likely to occur, is determined (hereafter referred to as N0). In this regard, it is assumed that a 4×4 block is likely to include considerable quantization generated noise if AC1m is substantially greater than AC0M. Experience has shown that that eight times AC1m greater than nine times AC0m (8×AC1m>9×AC0m) is a suitable approach for this determination.

Additionally, the number of 4×4 blocks within the uncoded macroblock being defined as "flat", is also counted (hereafter referred to as N1). A block is said to be "flat" if AC0m is less than a predefined threshold. Experience has shown that 25 is a suitable value for this threshold.

According to the invention, the corner blocks of the macroblock are paid special attention for the purpose of detecting if a corner problem is present. In this regard, the corner block having the greatest AC1m is found. If this AC1m value is substantially greater than the corresponding AC0m value for this block, it is assumed that a corner problem exists. Experience has shown that that two times AC1m greater than three times AC0M (2×AC1m>3×AC0m) is a suitable approach for this determination.

Having carried out the above described preparations, a final decision is made whether to intra code the macroblock or not. The decision is two parted and based on the calculated parameters and the preliminary tests. The first part of the decision process is mainly meant to intercept the case when a moving object just has left the area represented by the macroblock, or has just stopped moving. Quantization generated noise is assumed likely to occur, and the macroblock will be intra coded if all of the following is true:

The macroblock is defined as "skipped"
The corresponding macroblock of the previous picture in the video sequence was not defined as skipped.
AC1 associated with the macroblock is substantially greater than the corresponding AC0 or N0 is greater than a first predefined threshold or N1 is greater than a second predefined threshold in addition to that a corner problem exists In particular, experience has shown that proper values for the first and the second predefined threshold are 7 and 5, respectively. Further, a proposal for defining AC1 as substantially greater than AC0 is 8×AC1>9×AC0.

The second part of the decision process is mainly meant to intercept the case when an object within the area represented by the macroblock has just started moving. Quantization generated noise is assumed likely to occur, and the macroblock will be intra coded if the following is true:

The macroblock is defined as "skipped"
The corresponding macroblock of the previous picture in the video sequence was also defined as skipped.
A corner problem exists
The diagonal macroblock neighbor of the 4×4 block in which the corner problem reside is not defined as skipped.
N1 is greater than the second threshold.

Figure 2:
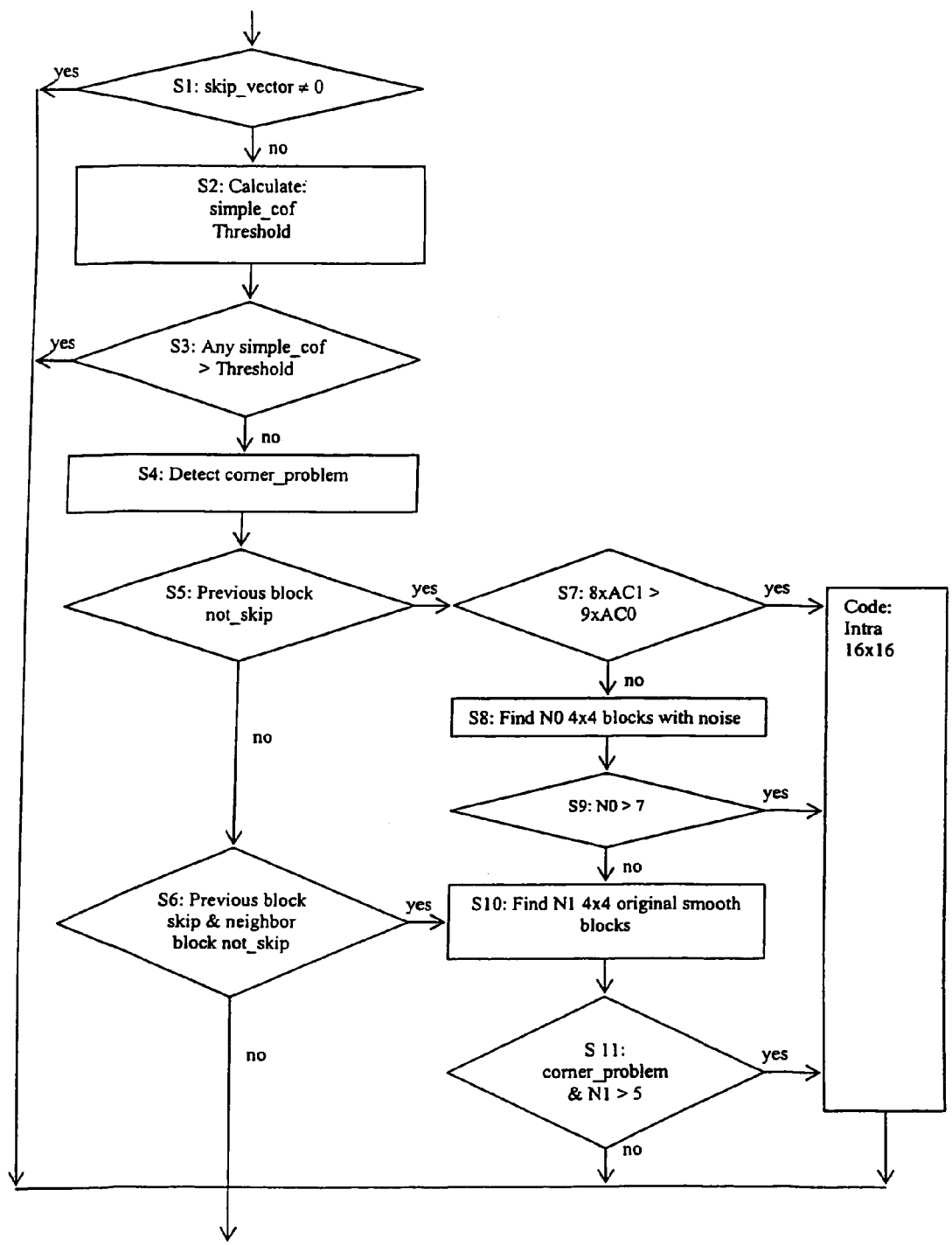
FIG. 2 is a flow chart depicting the steps of a preferred embodiment of the present invention.

An example of the decision process exposed to a macroblock is depicted in the flow chart of FIG. 2. The process starts by determining if the macroblock is skipped or not. This is done through the steps 1-3. Here, "simple_cof" is the binary-transform coefficients that are used to determine skip mode of each 4×4 block, and "Threshold" is the quantization threshold in the integer-transform domain with which they are compared. Only if the macroblock is defined as skipped, the process proceeds to step 4. Step 4 prepares for the coding type decision (intra vs. inter coding) by detecting if a corner problem exists. Thereafter, in step 5, it is determined if the previous macroblock was defined as skipped.

If so (choice "no" of step 5), the second part of the decision process described above will take place. This implies a further test (step 6) regarding whether the diagonal neighbor of the 4×4 corner block associated with the greatest AC1m is not skipped. If not (choice "yes" of step 6), the number of "flat" original 4×4 blocks (N1) is calculated (step 10), followed by the final test of the second decision process determining if a corner problem exists and if N1>5 (step 11). Only in the case where both these criteria are fulfilled, the macroblock is intra coded.

Returning to step 5, if the previous macroblock is determined as being not skipped (choice "yes" of step 5), the first part of the decision process described above will take place. Step 7 determines whether AC1 for the macroblock is substantially greater than AC0. If so (choice "yes" of step 7), it is decided to carry out intra coding of the macroblock without any further tests on the remaining parameters. If not, however, the number of 4×4 blocks (N0) where AC1m is substantially greater than AC0m is counted (step 8), and if this number is greater than 7 (choice "yes" of step 9), it is decided to carry out intra coding. If not (choice "no" of step 9), the decision of using intra or inter coding on the macroblock is left to step 10 and 11 as described above.

An advantage of the method according to the present invention is that it provides a fast update of blocks wherein annoying quantization generated noise is assumed to occur. It is powerful and results in strong visible improvements. No additional complexity is required in the decoding process and just a limited increase in the coding complexity is introduced.

The above-described methods can be used on an end-to-end link (i.e., the signal is encoded at an encoding site and sent directly through a gateway or multipoint control unit (MCU) to a decoding site). In another embodiment, the above-described methods can be used on a link-by-link basis (i.e., the signal is encoded at an encoding site and then sent to a gateway or MCU where the signal is decoded and then re-encoded according to the above-described methods). Details about MCU operations are known to one skilled in the art and are summarized in U.S. Pat. No. 6,584,077 to Polomski, the entire contents of which are incorporated herein by reference.

Figure 3:
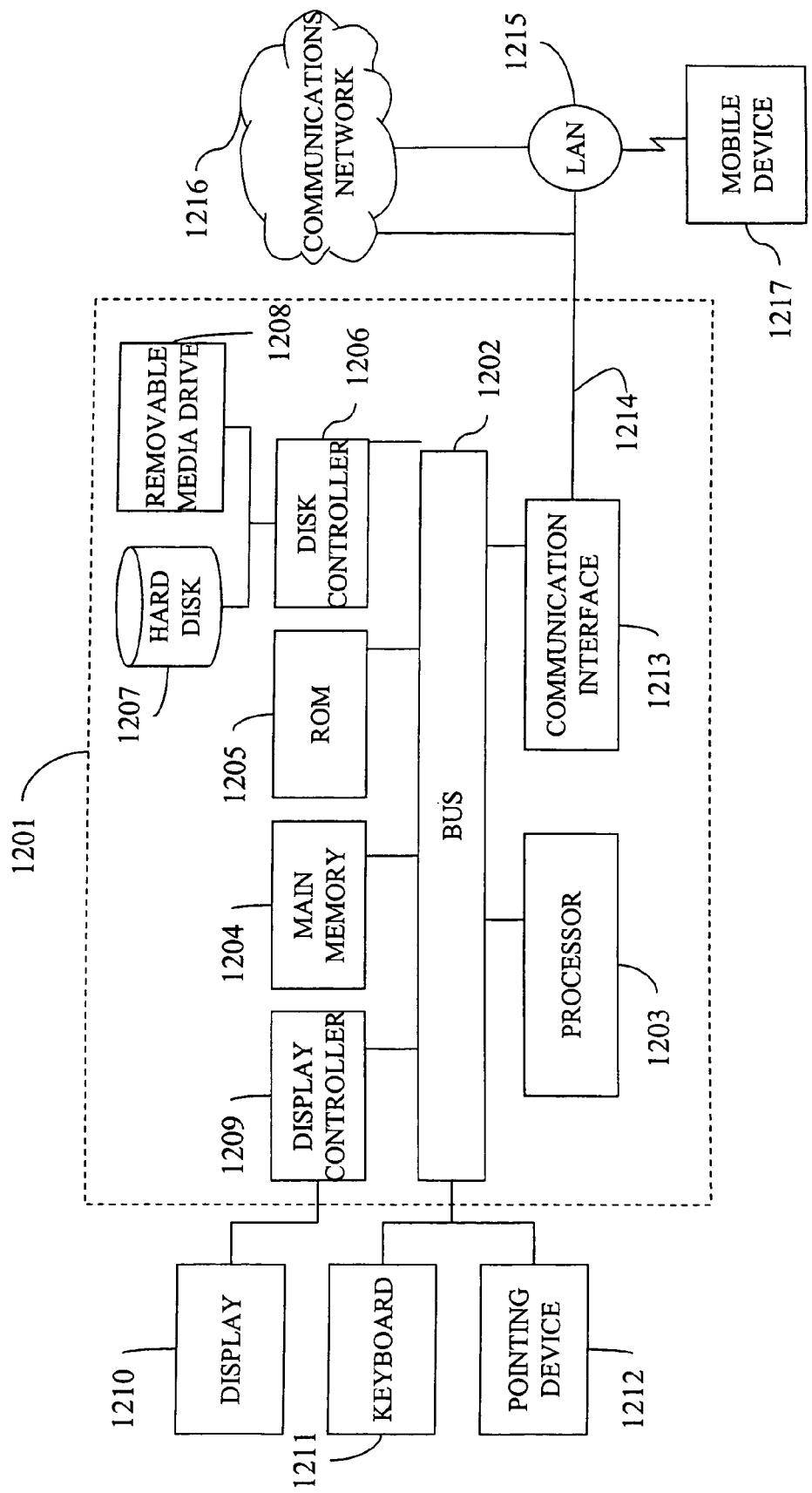
FIG. 3 is a block diagram of a computer used in association with the present invention.

The above described methods can be executed in firmware or software of an external or internal computing device located at opposing ends of a video-teleconference or related link. FIG. 3 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A method for noise prevention, comprising:
   coding a macroblock composed of a number of sub blocks representing a squared part of the video picture, said coding including predicting pixel values of the macroblock and one of transforming one of the pixel values and pixel prediction values and quantifying resulting transformation coefficients;
   executing a conditional uniformity test throughout the macroblock; and
   selecting, after said executing, intra prediction of pixel values in the macroblock if the conditional uniformity test indicates that a substantially subjective quantization generated noise due to movements in the video picture is likely to occur in a corresponding decoded version of the macroblock, or
   selecting, after said executing, inter prediction of pixel values in the macroblock if the conditional uniformity test indicates that no substantially subjective quantization generated noise due to movements in the video picture is likely to occur in a corresponding decoded version of the macroblock,
   wherein said step of executing includes,
   indicating that substantially subjective quantization generated noise is likely to occur when the following criteria are fulfilled:
   the macroblock is about to be defined as "skipped,"
   a previous corresponding macroblock was not defined as "skipped," and
   the pixel values are substantially uniform whereas the prediction values are substantially non-uniform.

2. The method according to claim 1, wherein the step of transforming further comprises one of:
   transforming the pixel values of the macroblock by ar binary-transform function generating associated pixel transform coefficients and transforming the prediction values of the macroblock by said binary-transform function generating associated prediction transform coefficients, and
   transforming residuals of the pixel and prediction values of the macroblock by said binary-transform function or calculating residuals of the pixel and prediction transform coefficients for generating associated residual transform coefficients.

3. A method for noise prevention, comprising:
   coding a macroblock composed of a number of sub blocks representing a squared part of the video picture, said coding including predicting pixel values of the macroblock and one of transforming one of the pixel values and pixel prediction values and quantifying resulting transformation coefficients;
   executing a conditional uniformity test throughout the macroblock; and selecting, after said executing, intra prediction of pixel values in the macroblock if the conditional uniformity test indicates that a substantially subjective quantization generated noise due to movement in the video picture is likely to occur in a corresponding decoded version of the macroblock, or selecting, after said executing, inter prediction of pixel values in the macroblock if the conditional uniformity test indicates that no substantially subjective quantization generated noise due to movement in the video picture is likely to occur in a corresponding decoded version of the macroblock, wherein said step of executing includes, indicating that substantially subjective quantization generated noise is likely to occur when the following criteria are fulfilled:

the macroblock is about to be defined as "skipped,"

a previous corresponding macroblock was not defined as "skipped," and one or a minority of singular pixels included in a corner sub block of the macroblock is/are divergent related to a majority of the pixels in the macroblock whereas the number of sub blocks including substantially uniform pixel values are greater than a first predefined threshold.

4. A method for noise prevention, comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout macroblock; and selecting, after said executing, intra prediction of pixel values in the macroblock if the conditional uniformity test indicates that a substantially subjective quantization generated noise due to movement in the video picture is likely to occur in corresponding decoded version of the macroblock, or selecting, after said executing, inter prediction of pixel values in the macroblock if the conditional uniformity test indicates that no substantially subjective quantization generated noise due to movement in the video picture is likely to occur in a corresponding decoded version of the macroblock, wherein said step of executing includes, indicating that substantially subjective quantization generated noise is likely to occur when the following criteria are fulfilled:

the macroblock is about to be defined as "skipped,"

a previous corresponding macroblock was defined as "skipped," and one or a minority of singular pixels included in a corner sub block of the macroblock is/are divergent related to a majority of the pixels in the macroblock whereas the number of sub blocks including substantially uniform pixel values are greater than a first predefined threshold, and a diagonal neighbor macroblock to said corner sub block is not, or is not about to be, defined as "skipped".

5. A method for noise prevention, comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout the macroblock; and selecting, after said executing, intra prediction of pixel value in the macroblock if the conditional uniformity test indicates that a substantially subjective quantization generated noise due to movements in the video picture is likely to occur in a corresponding decoded version of the macroblock, or selecting, after said executing, inter prediction of pixel values in the macroblock if the conditional uniformity test indicates that no substantially subjective quantization generated noise due to movements in the video picture is likely to occur in a corresponding decoded version of the macroblock, wherein the step of transforming further includes one of transforming the pixel values of the macroblock by binary-transform function generating associated pixel transform coefficients and transforming the prediction values of the macroblock by said binary-transform function generating, associated prediction transform coefficients, and transforming residuals of the pixel and prediction values of the macroblock by said binary-transform function or calculating residuals of the pixel and prediction transform coefficients for generating associated residual transform coefficients; and wherein said step of executing includes, assuming that a macroblock is defined as "skipped" if one or more residual transform coefficients corresponding to the lowest coordinates in the macroblock are less than a second predefined threshold corresponding to a decision value below which transform coefficients are quantified to zero.

6. A method for noise prevention, comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout the macroblock; and selecting, after said executing, intra prediction of pixel values in the macroblock if the conditional uniformity test indicates that a substantially subjective quantization generated noise due to movement in the video picture is likely to occur in a corresponding decoded version of the macroblock, or selecting, after said executing, inter prediction of pixel values in the macroblock if the conditional uniformity test indicates that no substantially subjective quantization generated noise due to movements in the video picture is likely to occur in a corresponding decoded version of the macroblock, wherein the step of transforming further includes one of transforming the pixel values of the macroblock by a binary-transform function generating associated pixel transform coefficients and transforming the prediction values of the macroblock by said binary-transform function generating associated prediction transform coefficients, and transforming residuals of the pixel and prediction values of the macroblock by said binary-transform function or calculating residuals of the pixel and prediction transform coefficients for generating associated residual transform coefficients; and wherein said step of executing includes, calculating a first parameter (AC0 m) for each sub block in the macroblock by summing one or more of the pixel transform coefficients of internally lowest coordinates within the respective sub blocks, except from the coefficient of the very lowest coordinates, and calculating a second parameter (AC1 m) for each sub block in the macroblock by summing one or more of the residual transform coefficients of internally lowest coordinates within the respective sub blocks, except from the coefficient of the very lowest coordinates.

7. The method according to claim 6, wherein said step of executing further comprises:

calculating a third parameter (AC0) by summing the first parameters (AC0 m) associated with all sub blocks included in the macroblock, and calculating a fourth parameter (AC1) by summing the second parameters (AC1 m) associated with all sub blocks included in the macroblock.

8. The method according to claim 7, wherein said step of executing further comprises:

assuming that the pixel values are substantially uniform whereas the prediction values are substantially non-uniform if said fourth parameter (AC1) is substantially greater than said third parameter (AC0) and/or said first number (N0) of sub blocks is greater than a four predefined threshold.

9. The method according to claim 6, wherein said step of executing comprises:

determining a first number (N0) of sub blocks in the macroblock wherein said second parameter (AC1 m) is substantially greater than said first parameter (AC0 m), and determining a second number (N1) of sub blocks in the macroblock wherein said first parameter (AC0 m) is less than a third predefined threshold.

10. The method according to claim 6, wherein said step of executing comprises:

determining the one corner sub block of the corner sub blocks in the macroblock having the greatest second parameter (AC1 m), and assuming that one or a minority of singular pixels included in that corner sub block is/are divergent related to a majority of the pixels in the macroblock if said second parameter (AC1 m) associated therewith is substantially greater than the corresponding first parameter (AC0 m).

11. The method according to claim 6, wherein said step of executing comprises:

predicting intra pixel values based on pixels adjacent to the macroblock in the same video picture.

12. A computer readable storage medium encoded with instructions, which when executed by a computer cause the computer to implement a method for noise prevention, the method comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout the macroblock; and selecting intra prediction of pixel values in the macroblock if the conditional uniformity test indicates that a substantially subjective quantization generated noise due to movements in the video picture is likely to occur in a corresponding decoded version of the macroblock, or selecting inter prediction of pixel values in the macroblock if the conditional uniformity test indicates that no substantially subjective quantization generated noise due to movements in the video picture is likely to occur in a corresponding decoded version of the macroblock, wherein the executing includes, indicating that substantially subjective quantization generated noise is likely to occur when the following criteria are fulfilled:

the macroblock is about to be defined as "skipped,"

a previous corresponding macroblock was not defined as "skipped," and the pixel values are substantially uniform whereas the prediction values are substantially non-uniform.

13. A computer readable storage medium encoded with instructions, which when executed by a computer cause the computer to implement a method for noise prevention, the method comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout the macroblock; and selecting intra prediction of pixel values in the macroblock if the conditional uniformity test indicates that a substantially subjective quantization generated noise due to movements in the video picture is likely to occur in a corresponding decoded version of the macroblock, or selecting inter prediction of pixel values in the macroblock if the conditional uniformity test indicates that no substantially subjective quantization generated noise due to movements in the video picture is likely to occur in a corresponding decoded version of the macroblock, wherein the executing includes, indicating that substantially subjective quantization generated noise is likely to occur when the following criteria are fulfilled:

the macroblock is about to be defined as "skipped,"

a previous corresponding macroblock was not defined as "skipped," and one or a minority of singular pixels included in a corner sub block of the macroblock is/are divergent related to a majority of the pixels in the macroblock whereas the number of sub blocks including substantially uniform pixel values are greater than a first predefined threshold.

14. A computer readable storage medium encoded with instructions, which when executed by a computer cause the computer to implement a method for noise prevention, the method comprising:

coding a macroblock composed of a number of sub blocks representing a squared part of the video picture, said coding including predicting pixel values of the macroblock and one of transforming one of the pixel values and pixel prediction values and quantifying resulting transformation coefficients;

executing a conditional uniformity test throughout the macroblock; and selecting intra prediction of pixel values in the macroblock if the conditional uniformity test indicates that a substantially subjective quantization generated noise due to movements in the video picture is likely to occur in a corresponding decoded version of the macroblock, or selecting inter prediction of pixel values in the macroblock if the conditional uniformity test indicates that no substantially subjective quantization generated noise due to movements in the video picture is likely to occur in a corresponding decoded version of the macroblock, wherein the executing includes, indicating that substantially subjective quantization generated noise is likely to occur when the following criteria are fulfilled:

the macroblock is about to be defined as "skipped,"

a previous corresponding macroblock was defined as "skipped," and one or a minority of singular pixels included in a corner sub block of the macroblock is/are divergent related, to a majority of the pixels in the macroblock whereas the number of sub blocks including substantially uniform pixel values are greater than a first predefined threshold, and a diagonal neighbor macroblock to said corner sub block is not, or is not about to be, defined as "skipped".

* * * * *